United States Patent
Chen et al.

(10) Patent No.: US 10,004,053 B2
(45) Date of Patent: *Jun. 19, 2018

(54) APPARATUSES AND METHODS FOR PHYSICAL BROADCAST CHANNEL (PBCH) ASSISTED SYNCHRONIZATION DURING A DISCONTINUOUS RECEPTION (DRX) OPERATION

(71) Applicant: MEDIATEK INC., Hsin-Chu (TW)

(72) Inventors: Wei-Jen Chen, Taipei (TW); Jianxuan Du, Shaanxi (CN); Yen-Hui Yeh, Hsinchu County (TW); Wei-Nan Sun, Zhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/441,327

(22) Filed: Feb. 24, 2017

(65) Prior Publication Data

US 2017/0164309 A1    Jun. 8, 2017

Related U.S. Application Data

(63) Continuation of application No. 14/546,175, filed on Nov. 18, 2014, now Pat. No. 9,591,599.

(60) Provisional application No. 61/921,634, filed on Dec. 30, 2013.

(51) Int. Cl.
*H04W 56/00* (2009.01)
*H04W 52/02* (2009.01)
*H04W 72/04* (2009.01)

(52) U.S. Cl.
CPC ..... *H04W 56/004* (2013.01); *H04W 52/0212* (2013.01); *H04W 52/0216* (2013.01); *H04W 52/0229* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2011/0237214 A1 | 9/2011 | Swarts et al. | |
| 2011/0263245 A1* | 10/2011 | Ishii | H04W 56/0015 455/423 |
| 2012/0140660 A1* | 6/2012 | Kang | H04L 1/0077 370/252 |
| 2014/0044027 A1 | 2/2014 | Beale | |
| 2014/0119255 A1 | 5/2014 | Vannithamby et al. | |
| 2014/0301263 A1* | 10/2014 | Ji | H04W 52/0216 370/311 |

FOREIGN PATENT DOCUMENTS

CN    101527595 A    9/2009

* cited by examiner

*Primary Examiner* — Vinncelas Louis
(74) *Attorney, Agent, or Firm* — McClure, Qualey & Rodack, LLP (57) ABSTRACT

A mobile communication device with a Radio Frequency (RF) unit and a processing unit is provided. The RF unit transmits and receives wireless signals to and from a service network. The processing unit configures the RF unit to communicate with the service network in a DRX operation, and uses a Physical Broadcast Channel (PBCH) for synchronizing with the service network during the DRX operation.

18 Claims, 8 Drawing Sheets

APPARATUSES AND METHODS FOR PHYSICAL BROADCAST CHANNEL (PBCH) ASSISTED SYNCHRONIZATION DURING A DISCONTINUOUS RECEPTION (DRX) OPERATION

CROSS REFERENCE TO RELATED APPLICATIONS

The present invention is a continuation of U.S. patent application Ser. No. 14/546,175, filed on Nov. 18, 2014, now U.S. Pat. No. 9,591,599, which claims priority of U.S. Provisional Application No. 61/921,634, filed on Dec. 30, 2013, the entirety of which is incorporated by reference herein.

BACKGROUND OF THE INVENTION

Field of the Invention

The invention generally relates to synchronization of mobile communications, and more particularly, to apparatuses and methods for Physical Broadcast Channel (PBCH) assisted synchronization during a Discontinuous Reception (DRX) operation.

Description of the Related Art

Figure 1:
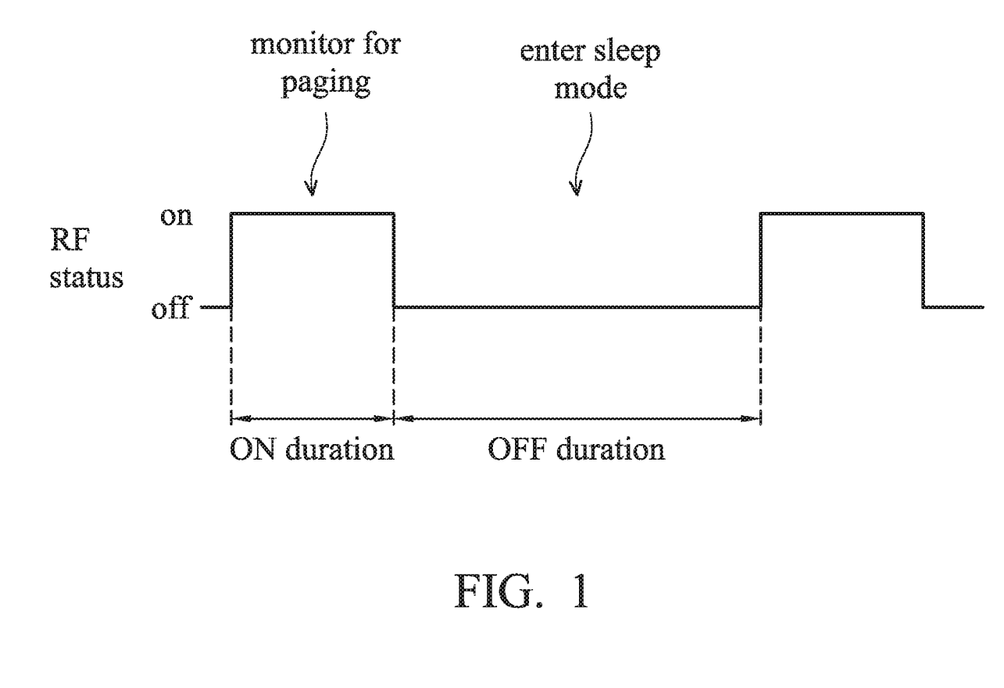
FIG. 1 is a schematic diagram of an exemplary DRX operation.

In a typical mobile communication environment, communications between a mobile device and a service network are performed arbitrarily according to the requests from or to the user of the mobile device. Since wireless transmission and reception are not necessarily performed at all times, keeping the mobile device always operating in transmission mode or reception mode causes unnecessary power consumption. For conserving battery power of the mobile device and saving wireless resources of the service network, a technique called Discontinuous Reception (DRX) operation is employed when there is no potential wireless transmission and reception for the mobile device in a forthcoming period of time. As shown in FIG. 1, in the OFF duration of the DRX operation, the service network does not page the mobile device and the mobile device enters a sleep mode in which at least the functionality of wireless transmission and reception is turned off. In the ON duration of the DRX operation, the mobile device wakes up from the sleep mode and turns on the functionality of wireless transmission and reception to operate in reception mode for monitoring possible paging from the service network.

However, due to the functionality of wireless transmission and reception being turned off in the sleep mode, the mobile device may become unsynchronized with the service network in the OFF duration of the DRX operation. That is, the timing drift and the frequency offset may increase too much for the mobile device to recover to be in-sync with the service network. Generally, the mobile device relies on pilot/reference signals to re-synchronize with the service network, but this inevitably results in an additional period of time for the mobile device to wake up from the sleep mode to receive the pilot/reference signals from the service network. Not to mention that, in some mobile communication systems, e.g., the Long Term Evolution (LTE) system, the time domain density of the pilot/reference signals is low, which prolongs the additional period of time required for re-synchronization.

Alternatively, it is proposed for the mobile device to re-do a cell search to acquire the timing and frequency information of the service network, after detecting that it is out-of-sync with the service network. Nonetheless, it takes a long time to finish a cell search, which not only consumes more power, but also impacts user experience.

In another conventional practice, it is proposed for the mobile device to employ a better crystal to maintain the timing drift and the frequency offset within an acceptable range when the mobile device is in the sleep mode. However, a better crystal capable of providing such an effect is expensive. As far as hardware cost is concerned, this practice has a significant drawback.

Thus, it is desirable to have a more power-efficient and cost-conserving way of solving the synchronization issue raised during the DRX operation.

BRIEF SUMMARY OF THE INVENTION

In one aspect of the invention, a mobile communication device is provided. The mobile communication device comprises a Radio Frequency (RF) unit and a processing unit. The RF unit transmits and receives wireless signals to and from a service network. The processing unit configures the RF unit to communicate with the service network in a DRX operation, and uses a Physical Broadcast Channel (PBCH) for synchronizing with the service network during the DRX operation.

In another aspect of the invention, a synchronization method executed by a mobile communication device is provided. The synchronization method comprises the steps of: communicating with a service network in a DRX operation; and using a Physical Broadcast Channel (PBCH) for synchronizing with the service network during the DRX operation.

Other aspects and features of the invention will become apparent to those with ordinary skill in the art upon review of the following descriptions of specific embodiments of the mobile communication device and the synchronization method.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

Figure 2:
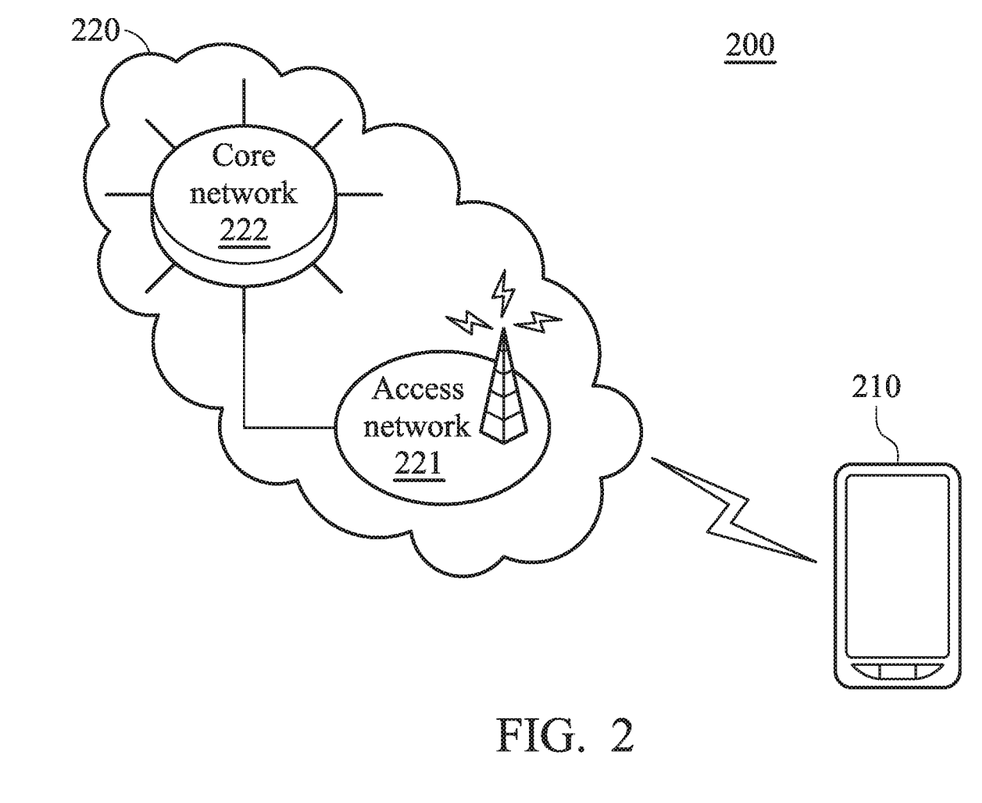
FIG. 2 is a block diagram of a mobile communication environment according to an embodiment of the invention.

FIG. 2 is a block diagram of a mobile communication environment according to an embodiment of the invention. The mobile communication environment 200 comprises a mobile communication device 210 and a service network 220, wherein the mobile communication device 210 is wirelessly connected to the service network 220 for obtaining mobile services, including voice and/or data services. The mobile communication device 210 may be a feature phone, a smartphone, a panel Personal Computer (PC), or any computing device supporting the wireless technology utilized by the service network 220. The service network 220 may be an LTE system, an LTE-Advanced (LTE-A) system, a Time-Division LTE (TD-LTE) system, or any future evolution of the LTE-based system.

To further clarify, the service network 220 comprises at least an access network 221 and a core network 222, wherein the access network 221 is responsible for processing radio signals, terminating radio protocols, and connecting the mobile communication device 210 with the core network 222, and the core network 222 is responsible for performing mobility management, network-side authentication, and interfaces with public networks, e.g., the Internet. For example, if the service network 220 is an LTE/LTE-A/TD-LTE system, the access network 221 may be an Evolved-UTRAN (E-UTRAN) which includes at least an evolved NB (eNB), and the core network 222 may be an Evolved Packet Core (EPC) which includes a Home Subscriber Server (HSS), Mobility Management Entity (MME), Serving Gateway (S-GW), and Packet Data Network Gateway (PDN-GW or P-GW).

Figure 3:
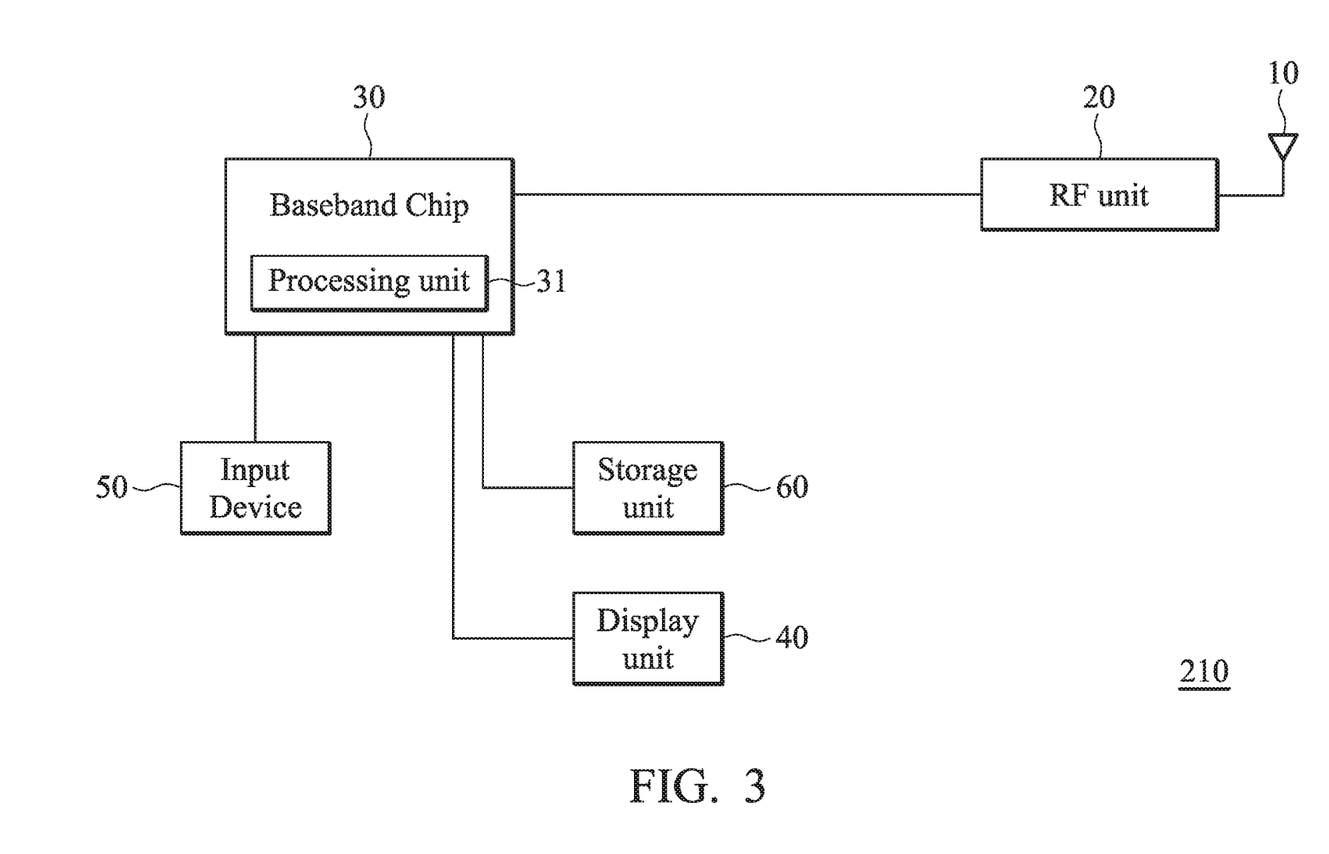
FIG. 3 is a block diagram illustrating the mobile communication device 210 according to an embodiment of the invention.

FIG. 3 is a block diagram illustrating the mobile communication device 210 according to an embodiment of the invention. The mobile communication device 210 comprises an antenna 10, a Radio Frequency (RF) unit 20, a Baseband chip 30, a display unit 40, an input device 50, and a storage unit 60, wherein the RF unit 20, the display unit 40, the input device 50, and the storage unit 60 are coupled to the Baseband chip 30, and the antenna 10 is coupled to the RF unit 20. The Baseband chip 30 comprises a processing unit 31 for controlling the RF unit 20, sending a series of frame data (e.g. representing text messages, graphics, images or others) to the display unit 40, receiving signals from the input device 50, and storing and retrieving data to and from the storage unit 60. The processing unit 31 may be a general purpose processor, a Micro-Processing Unit (MPU), a Micro Control Unit (MCU), a Digital Signal Processor (DSP), or others. Additionally, the Baseband chip 30 may further contain other hardware components to perform baseband signal processing, including Analog-to-Digital (ADC)/Digital-to-Analog (DAC) conversion, gain adjusting, modulation/demodulation, encoding/decoding, and so on. The RF unit 20 may receive RF wireless signals via the antenna 10, convert the received RF wireless signals to baseband signals, which are processed by the Baseband chip 30, or receive baseband signals from the Baseband chip 30 and convert the received baseband signals to RF wireless signals, which are later transmitted via the antenna 10. The RF unit 20 may also contain multiple hardware devices to perform radio frequency conversion. For example, the RF unit 20 may comprise a mixer to multiply the baseband signals with a carrier oscillated in the radio frequency of the mobile communications system, wherein the radio frequency may be 900 MHz, 2100 MHz, or 2.6 GHz utilized in LTE/LTE-A/TD-LTE technology, or others depending on the wireless technology in use.

The display unit 40 may be a Liquid Crystal Display (LCD), Light-Emitting Diode (LED) display, or Electronic Paper Display (EPD), etc., for providing a display function. Alternatively, the display unit 40 may further comprise one or more touch sensors disposed thereon or thereunder for sensing touches, contacts, or approximations of objects, such as fingers or styluses.

The input device 50 may comprise one or more buttons, a keyboard, a mouse, a touch pad, a video camera, a microphone, and/or a speaker, etc., serving as the Man-Machine Interface (MIMI) for interactions with users.

The storage unit 60 may be a memory (e.g., Random Access Memory (RAM), Flash memory, or Non-Volatile Random Access Memory (NVRAM), etc.), or a magnetic storage device (e.g., magnetic tap or hard disk) an optical storage device (e.g., Compact Disc Read-Only Memory (CD-ROM)), or any combination thereof for storing data, including instructions, program code, and user data, etc.

Although not shown, the mobile communication device 210 may further comprise other functional units, such as a vibrator, a power supply, a Global Positioning System (GPS) unit for obtaining location information, or others, and the invention is not limited thereto.

Unlike conventional mobile communication devices, the mobile communication device 210 of the invention uses the Physical Broadcast Channel (PBCH), instead of the Downlink Control Channel (PDCCH) or Physical Downlink Shared Channel (PDSCH), for synchronizing with the service network 220 during the DRX operation. Specifically, the PBCH is used to carry system information, and the PDCCH/PDSCH is generally used to carry Common Reference Signal (CRS) (also called pilot signal), wherein the time domain density of the Common Reference Signal (CRS) is ⅓ to ¼, i.e., there is 1 CRS in every 3 to 4 symbols, while the PBCH data comes in 4 continuous symbols for every occurrence. Advantageously, the synchronization using the PBCH is more time-efficient and more power-efficient than the synchronization using the PDCCH/PDSCH. For example, if 4 symbols are required for obtaining enough information for synchronization, the mobile communication device 210 needs to wake up for approximately 2 milliseconds (i.e., the period of time for 4 continuous symbols) when using the PBCH for synchronization, and approximately 6 to 8 milliseconds (i.e., the period of time for 12 to 16 continuous symbols which contain about 4 CRS) when using the PDCCH/PDSCH for synchronization.

Figure 4:
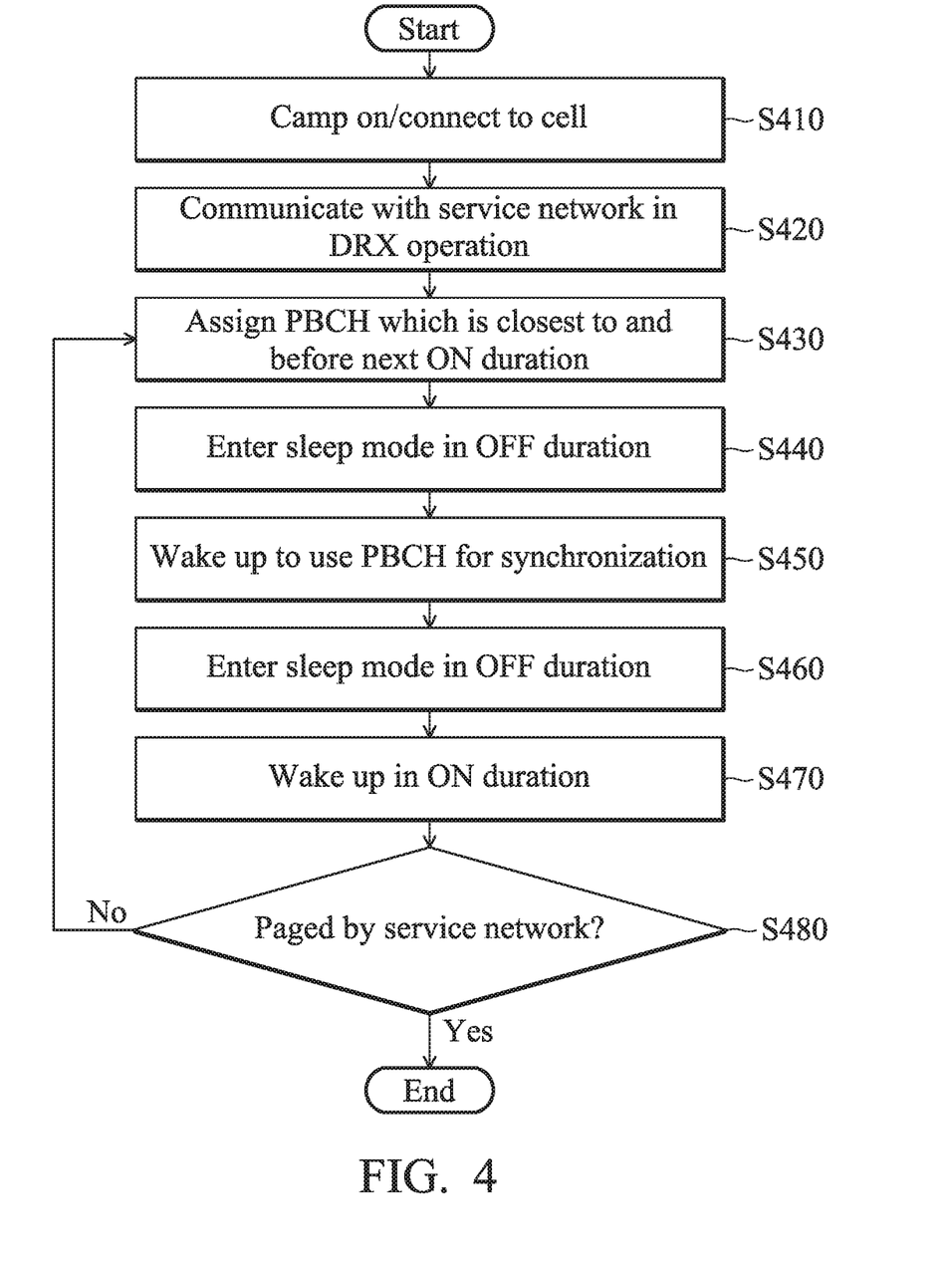
FIG. 4 is a flow chart illustrating the synchronization method according to an embodiment of the invention.

FIG. 4 is a flow chart illustrating the synchronization method according to an embodiment of the invention. The synchronization method may be applied to or executed by a mobile communication device, e.g., the mobile communication device 210, and more specifically, the synchronization method may be executed by a processing unit, e.g., the processing unit 31 of the Baseband chip 30, of the mobile communication device. To begin, the mobile communication device successfully camps on or connects to a cell of a service network (step S410). In one embodiment, the mobile communication device may be configured to operate in an idle mode, e.g., RRC_IDLE mode (i.e., the idle mode specified in the Radio Resource Control (RRC) layer of the communication protocol utilized between the mobile communication device and the service network), after camping on the cell. In another embodiment, the mobile communication device may be configured to operate in a connected mode, e.g., RRC_CONNECTED mode (i.e., the connected mode specified in the RRC layer of the communication protocol utilized between the mobile communication device and the service network) after connecting to the cell.

It is noted that, the timing and frequency information of the cell is known to the mobile communication device when it successfully camps on or connects to the cell. Next, the mobile communication device is configured to communicate with the service network in the DRX operation (step S420). That is, the processing unit configures the RF unit to communicate with the service network in the DRX operation. Specifically, the DRX operation may be configured by the service network via an RRC message, such as RRC CONNECTION SETUP message, RRC CONNECTION RECONFIGURATION message, RRC CONNECTION REESTABLISHMENT message, or others. Subsequently, the processing unit assigns the PBCH, which is closest to and before the next ON duration of the DRX operation, to the RF unit (step S430), and then the mobile communication device enters the sleep mode in the OFF duration of the DRX operation (step S440). Specifically, when the mobile communication device is in the sleep mode, the RF unit is turned off or operates in a low-voltage state, and the processing unit operates in a low-voltage state as well.

Later, when the assigned PBCH comes, the mobile communication device wakes up from the sleep mode to use the PBCH for synchronizing with the service network during the DRX operation (step S450). Specifically, when the mobile communication device wakes up from the sleep mode, the RF unit is turned on or recovers to a high-voltage state for receiving PBCH data, and the processing unit recovers to a high-voltage state as well. The synchronization with the cell of the service network is performed to resolve the timing drift and the frequency offset caused in the current OFF duration of the DRX operation. Note that, the assigned PBCH comes in the OFF duration of the DRX operation, so the mobile communication device enters the sleep mode again after finishing the synchronization with the service network (step S460).

After that, when the current OFF duration ends and the next ON duration begins, the mobile communication device wakes up from the sleep mode for receiving PDCCH/PDSCH data and then demodulates and decodes the PDCCH/PDSCH data (step S470). After demodulating and decoding the PDCCH/PDSCH data, the mobile communication device determines whether it has been paged by the service network (step S480). If the mobile communication device has not been paged by the service network in the ON duration, the synchronization method loops back to step S430. Otherwise, if the mobile communication device has been paged by the service network in the ON duration, the synchronization method ends and the mobile communication device may proceed as instructed by the received paging message (this part of detailed description is omitted herein as it is beyond the scope of the invention).

Figure 5:
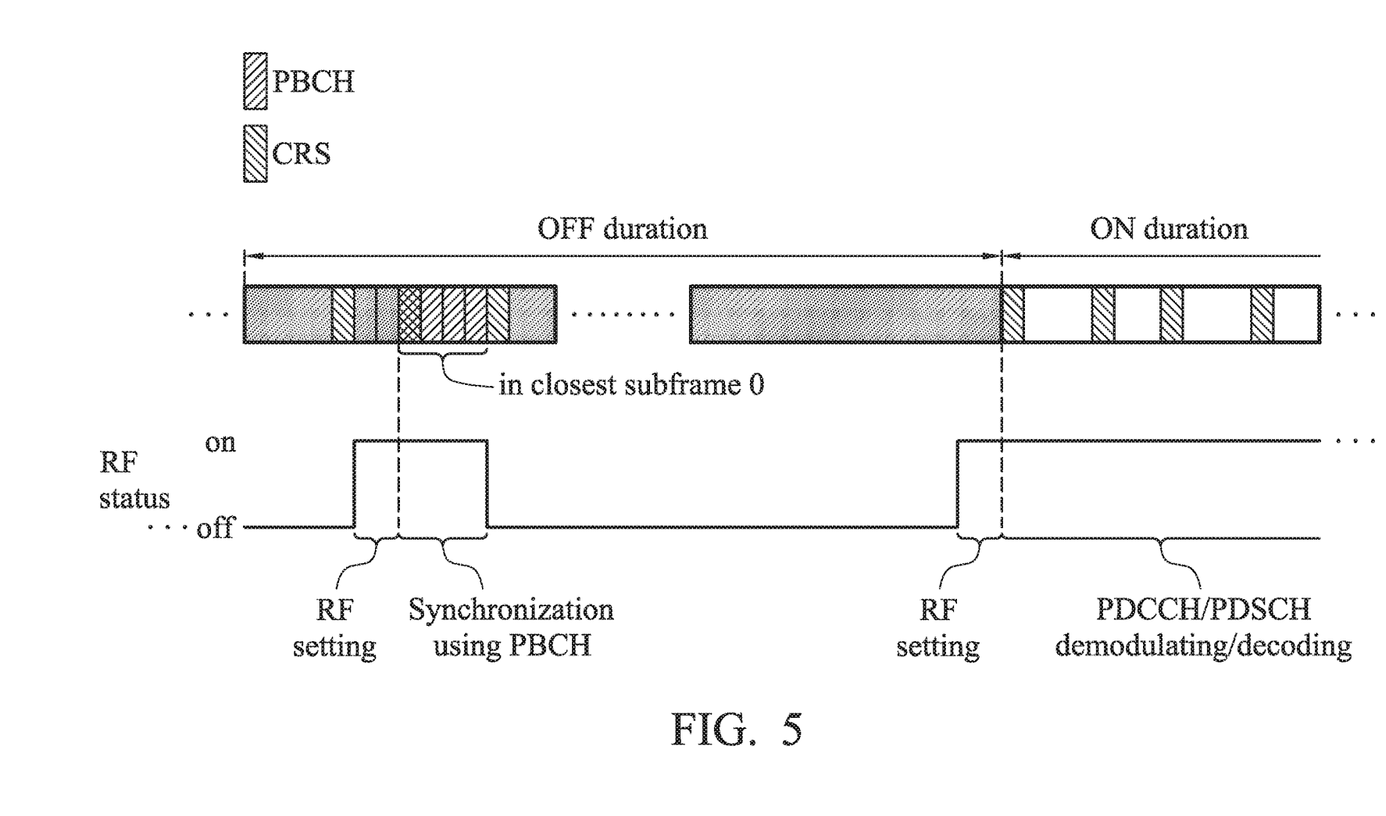
FIG. 5 is a schematic diagram illustrating the RF status along with occurrences of PBCH data and CRS according to the embodiment of FIG. 4.

FIG. 5 is a schematic diagram illustrating the RF status along with occurrences of PBCH data and CRS according to the embodiment of FIG. 4. As shown in FIG. 5, the first row from the top denotes the occurrence of PBCH data and CRS, and the second row denotes the RF status of the mobile communication device (i.e., the status of the RF unit in the mobile communication device). Although the PBCH data comes in each subframe 0, the assigned PBCH specifically refers to subframe 0 which is closest to and before the next ON duration of the DRX operation. Particularly, the subframe 0 with the assigned PBCH is in the OFF duration of the DRX operation. Therefore, in the OFF duration, the RF status is initially set to "off", and then set to "on" for receiving the PBCH data for synchronization with the service network. Specifically, for setting the RF unit, the RF status is set to "on" some time earlier than the occurrence of the assigned PBCH, so that the RF unit may be ready for receiving the PBCH data. As soon as the synchronization with the service network is finished, the RF status is set to "off" again until the next ON duration. Similarly, for setting the RF unit, the RF status is set to "on" some time earlier than the next ON duration, so that the RF unit may be ready for demodulating/decoding the received PDCCH/PDSCH data, including CRS.

Figure 6:
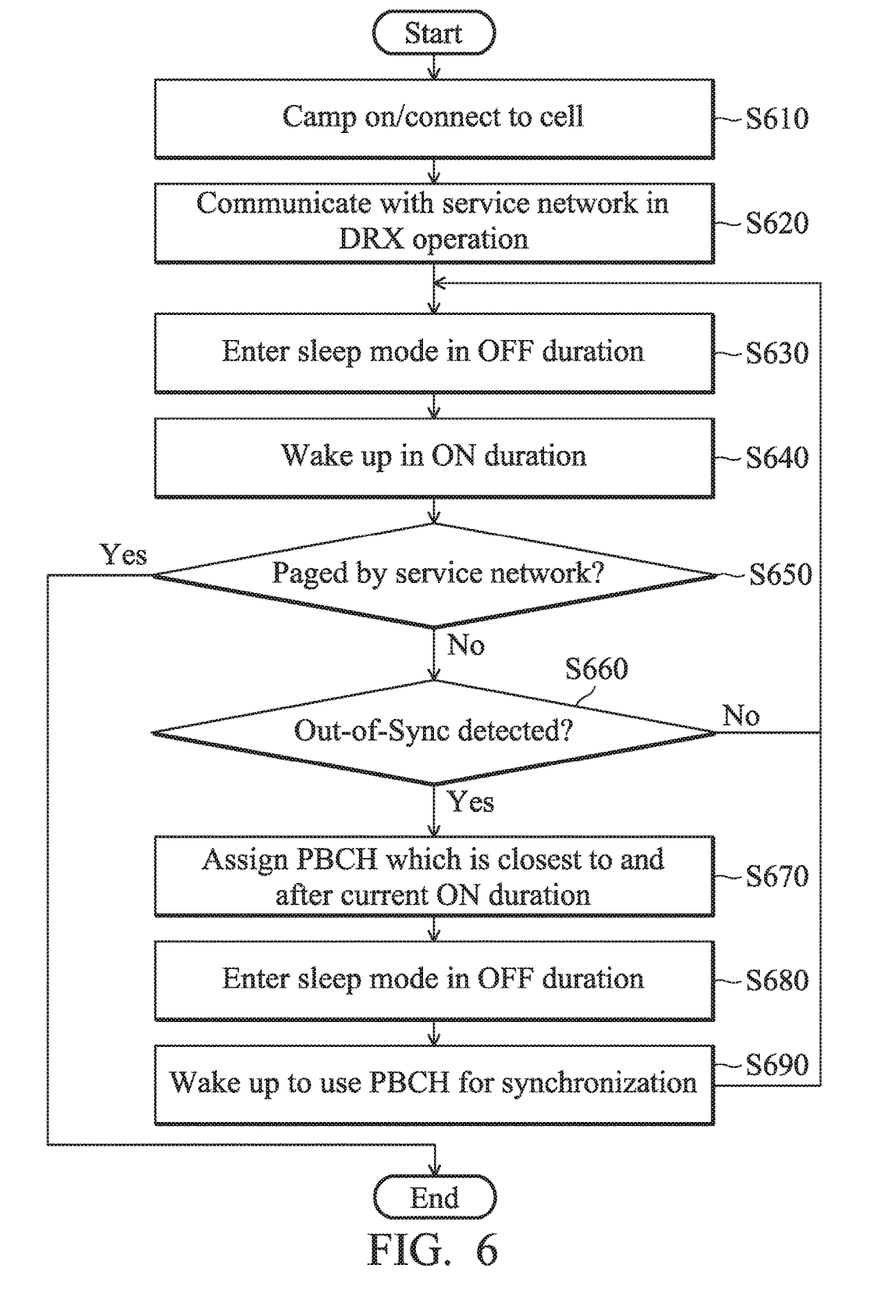
FIG. 6 is a flow chart illustrating the synchronization method according to another embodiment of the invention.

FIG. 6 is a flow chart illustrating the synchronization method according to another embodiment of the invention. Similar to the embodiment of FIG. 4, the synchronization method may be applied to or executed by a mobile communication device, e.g., the mobile communication device 210, and more specifically, the synchronization method may be executed by a processing unit, e.g., the processing unit 31 of the Baseband chip 30, of the mobile communication device. To begin, the mobile communication device successfully camps on or connects to a cell of a service network (step S610). In one embodiment, the mobile communication device may be configured to operate in an idle mode, e.g., RRC_IDLE mode (i.e., the idle mode specified in the RRC layer of the communication protocol utilized between the mobile communication device and the service network), after camping on the cell. In another embodiment, the mobile communication device may be configured to operate in a connected mode, e.g., RRC_CONNECTED mode (i.e., the connected mode specified in the RRC layer of the communication protocol utilized between the mobile communication device and the service network) after connecting to the cell.

It is noted that, the timing and frequency information of the cell is known to the mobile communication device when it successfully camps on or connects to the cell. Next, the mobile communication device is configured to communicate with the service network in the DRX operation (step S620). That is, the processing unit configures the RF unit to communicate with the service network in the DRX operation. Specifically, the DRX operation may be configured by the service network via an RRC message, such as RRC CONNECTION SETUP message, RRC CONNECTION RECONFIGURATION message, RRC CONNECTION REESTABLISHMENT message, or others. Subsequently, the mobile communication device enters the sleep mode in the OFF duration of the DRX operation (step S630). Specifically, when the mobile communication device is in the sleep mode, the RF unit is turned off or operates in a low-voltage state, and the processing unit operates in a low-voltage state as well.

Later, when the current OFF duration ends and the ON duration begins, the mobile communication device wakes up from the sleep mode for receiving PDCCH/PDSCH data and then demodulates and decodes the PDCCH/PDSCH data (step S640). After demodulating and decoding the PDCCH/PDSCH data, the mobile communication device determines whether it has been paged by the service network (step S650). If the mobile communication device has been paged by the service network in the ON duration, the synchronization method ends and the mobile communication device may proceed as instructed by the received paging message (this part of detailed description is omitted herein as it is beyond the scope of the invention). Otherwise, if the mobile communication device has not been paged by the service network in the ON duration, it is subsequently determined whether the mobile communication device is out-of-sync with the service network (i.e., an out-of-synchronization with the service network is detected) (step S660). If the mobile communication device is out-of-sync with the service network, the processing unit assigns the PBCH, which is closest to and after the ON duration, to the RF unit (step S670), and then the mobile communication device enters the sleep mode in the OFF duration (step S680). Otherwise, if the mobile communication device is not out-of-sync with the service network, the synchronization method loops back to step S630.

In another embodiment of step S670, the processing unit may assign the PBCH, which is closest to and before the next ON duration, to the RF unit.

After that, when the assigned PBCH comes, the mobile communication device wakes up from the sleep mode to use the PBCH for synchronizing with the service network during the DRX operation (step S690), and then the synchronization method loops back to step S630. Specifically, when the mobile communication device wakes up from the sleep mode, the RF unit is turned on or recovers to a high-voltage state for receiving the PBCH data, and the processing unit recovers to a high-voltage state as well. The synchronization with the cell of the service network is performed to resolve the timing drift and the frequency offset caused in the OFF duration(s) of the DRX operation.

Figure 7:
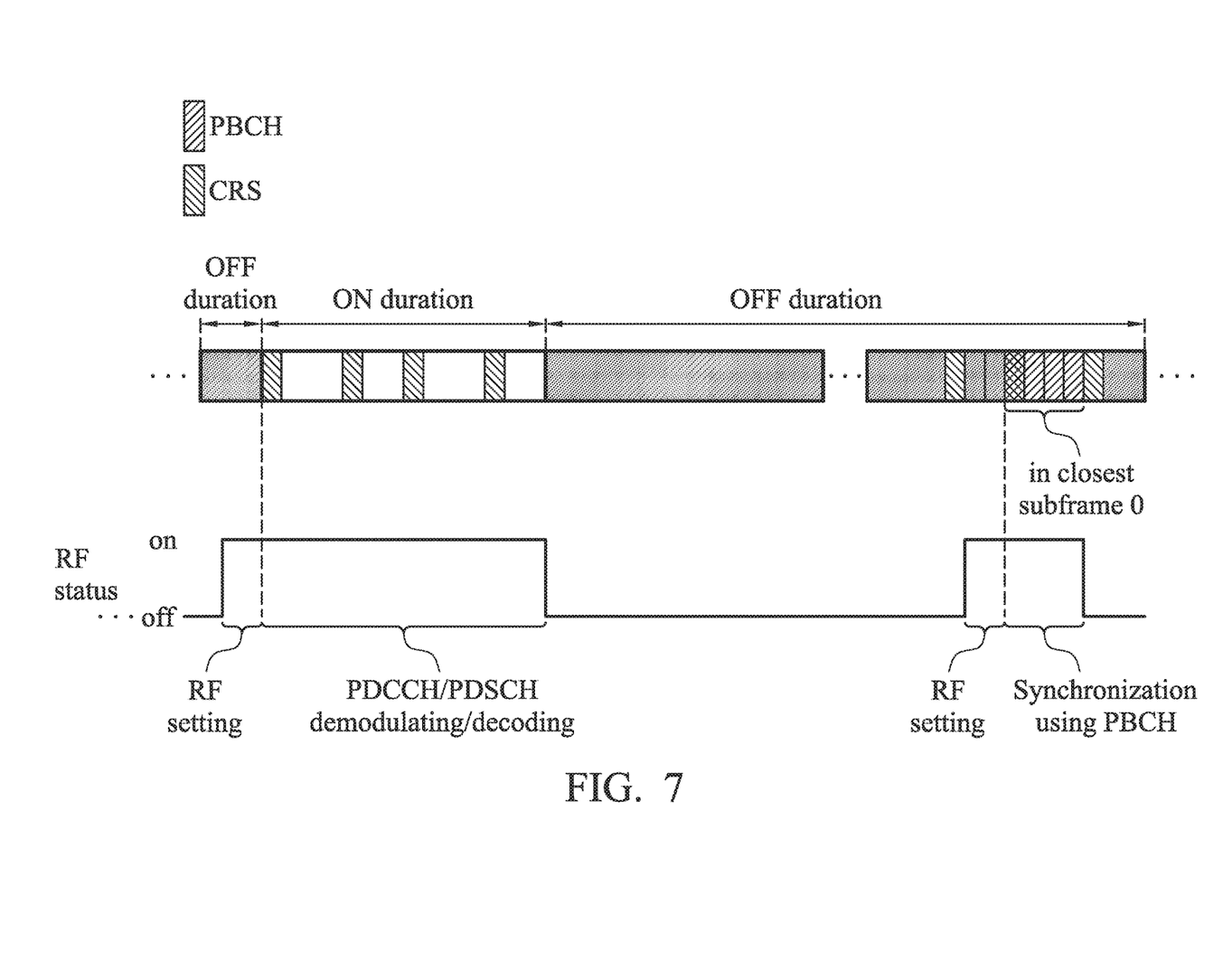
FIG. 7 is a schematic diagram illustrating the RF status along with occurrences of PBCH data and CRS according to the embodiment of FIG. 6.

FIG. 7 is a schematic diagram illustrating the RF status along with occurrences of PBCH data and CRS according to the embodiment of FIG. 6. As shown in FIG. 7, the first row from the top denotes the occurrence of PBCH data and CRS, and the second row denotes the RF status of the mobile communication device (i.e., the status of the RF unit in the mobile communication device). Before the ON duration of the DRX operation, the RF status is initially set to "off". Later, when the ON duration begins, the RF status is set to "on" for demodulating/decoding the received PDCCH/PDSCH data, including CRS. Specifically, for setting the RF unit, the RF status is set to "on" some time earlier than the ON duration, so that the RF unit may be ready for demodulating/decoding the received PDCCH/PDSCH data. When the ON duration ends, the RF status is set to "off" again until the occurrence of the assigned PBCH. As the PBCH data comes in each subframe 0, the assigned PBCH specifically refers to the subframe 0 which is closest to and after the denoted ON duration. Particularly, the subframe 0 with the assigned PBCH is in an OFF duration. That is, in the OFF duration, the RF status is initially set to "off", and then set to "on" for receiving the PBCH data for synchronization with the service network. Similarly, for setting the RF unit, the RF status is set to "on" some time earlier than the occurrence of the assigned PBCH, so that the RF unit may be ready for receiving the PBCH data.

Figure 8:
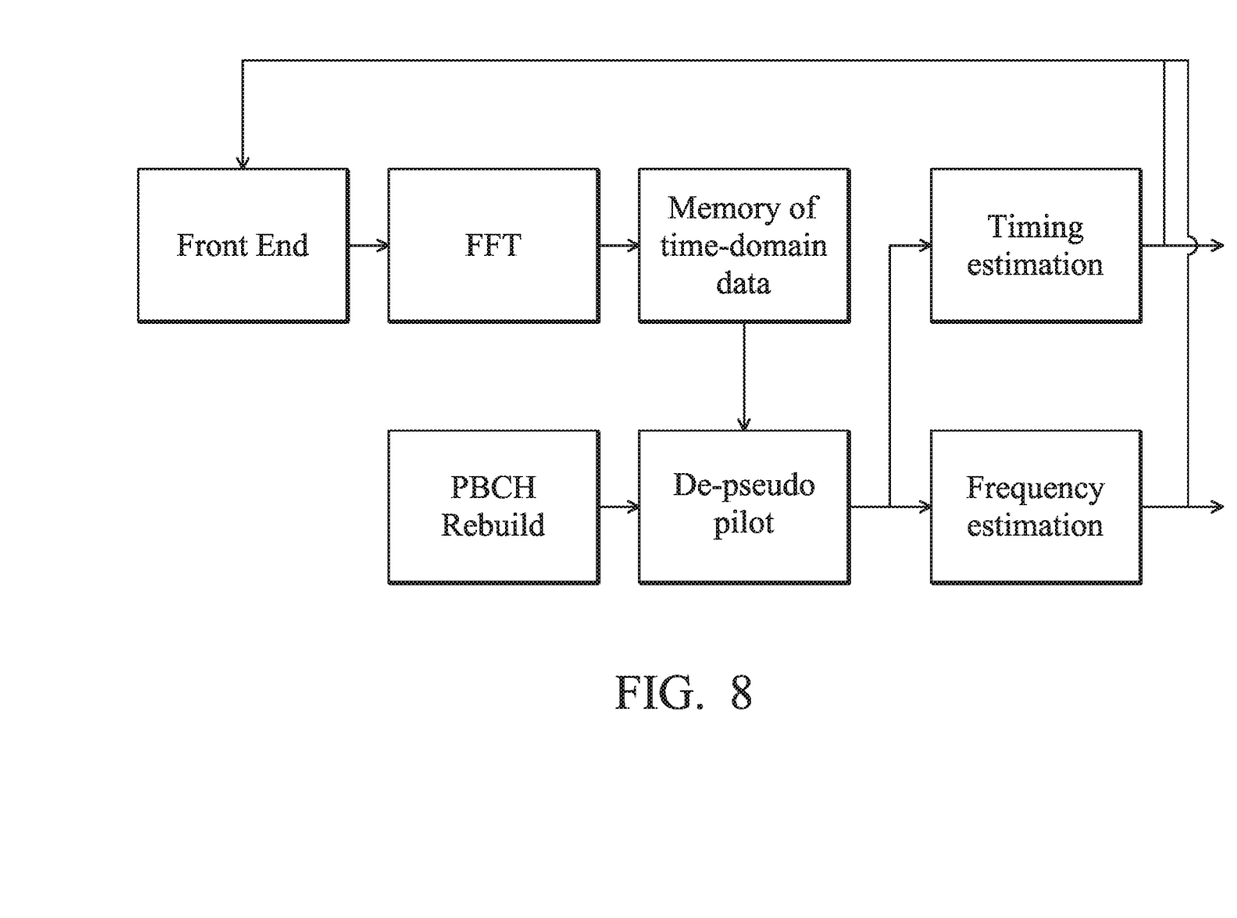
FIG. 8 is an exemplary diagram illustrating the synchronization using PBCH according to an embodiment of the invention.

As to the synchronization using PBCH in steps S450 and S690, the general idea is to rebuild the PBCH as pseudo-pilots for timing and frequency adjustment. FIG. 8 is an exemplary diagram illustrating the synchronization using PBCH according to an embodiment of the invention. Firstly, as shown in FIG. 8, the front end (i.e., the RF unit) is responsible for receiving wireless signals and outputting the information of received wireless signals to the Fast Fourier Transform (FFT) function for converting frequency-domain data of the wireless signals to time-domain data, and/or vice versa, thereafter the time-domain data of the wireless signals is temporarily stored in memory. In the meantime, the PBCH is rebuilt as pseudo-pilots according to the PBCH data. Subsequently, the time-domain data stored in the memory is retrieved to De-pilot the pseudo-pilots and the results are further sent to estimate the timing drift and frequency offset. Specifically, for timing estimation, the timing drift may be calculated based on the changes of the channels, which are in neighboring carriers, in the frequency domain. Likewise, for frequency estimation, the frequency offset may be calculated based on the changes of the channels, which are in neighboring symbols, in the time domain. After that, the estimated timing drift and frequency offset are fed back to the front end for adjusting the timing and frequency in use, to be in-sync with the service network. It is to be understood that, the diagram of FIG. 8 is merely an illustrative example, and the invention is not limited thereto. For instance, the FFT function may be pulled back to be performed after the memory of the time-domain data, and a Numerical Controlled Oscillator (NCO) may be introduced between the memory of the time-domain data and the FFT function, which is responsible for creating a synchronous (i.e., clocked), discrete-time, and discrete-valued representation of a waveform for the time-domain data. Alternatively, as the timing drift and frequency offset are unknown, recursive selection of a timing drift and a frequency offset from a plurality of possible timing drifts and frequency offsets may be used for demodulating/decoding the PBCH data, and if the demodulating/decoding is successful, the selected timing drift and frequency offset may be considered as correct.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile communication device, comprising:
   a Radio Frequency (RF) unit, transmitting and receiving wireless signals to and from a service network; and
   a processing unit, configuring the RF unit to operate in a discontinuous reception operation to communicate with the service network, and using a broadcast message for synchronizing with the service network during the discontinuous reception operation,
   wherein the synchronization with the service network is performed in an OFF duration of the discontinuous reception operation.

2. The mobile communication device of claim 1, wherein the broadcast message is a Physical Broadcast Channel (PBCH) message.

3. The mobile communication device of claim 1, wherein the synchronization with the service network is performed to resolve a timing drift and a frequency offset caused during the discontinuous reception operation.

4. The mobile communication device of claim 1, wherein the OFF duration is before an ON duration of the discontinuous reception operation.

5. The mobile communication device of claim 4, wherein the OFF duration is the closest OFF duration to the ON duration.

6. The mobile communication device of claim 4, wherein the RF unit is initially turned off in the OFF duration, and the processing unit further turns on the RF unit for the synchronization and turns off the RF unit after the synchronization until a next ON duration of the discontinuous reception operation.

7. The mobile communication device of claim 1, wherein the OFF duration is after an ON duration of the discontinuous reception operation, and the synchronization with the service network is performed when detecting an out-of-synchronization with the service network in the ON duration.

8. The mobile communication device of claim 7, wherein the out-of-synchronization is detected after finishing demodulating and decoding Physical Downlink Control Channel (PDCCH) data or Physical Downlink Shared Channel (PDSCH) data received from the service network in the ON duration.

9. The mobile communication device of claim 7, wherein the OFF duration is the closest OFF duration to the ON duration, or the closest OFF duration to a next ON duration.

10. A synchronization method executed by a mobile communication device, comprising:
    communicating with a service network in a discontinuous reception operation; and
    using a broadcast message for synchronizing with the service network during the discontinuous reception operation,
    wherein the synchronization with the service network is performed in an OFF duration of the discontinuous reception operation.

11. The synchronization method of claim 10, wherein the broadcast message is a Physical Broadcast Channel (PBCH) message.

12. The synchronization method of claim 10, wherein the synchronization with the service network is performed to resolve a timing drift and a frequency offset caused during the discontinuous reception operation.

13. The synchronization method of claim 10, wherein the OFF duration is before an ON duration of the discontinuous reception operation.

14. The synchronization method of claim 13, wherein the OFF duration is the closest OFF duration to the ON duration.

15. The synchronization method of claim 13, wherein a Radio Frequency (RF) unit of the mobile communication device is initially turned off in the OFF duration, and the synchronization method further comprises:
    turning on the RF unit for the synchronization and turning off the RF unit after the synchronization until a next ON duration of the discontinuous reception operation.

16. The synchronization method of claim 10, wherein the OFF duration is after an ON duration of the discontinuous reception operation, and the synchronization with the service network is performed when detecting an out-of-synchronization with the service network in the ON duration.

17. The synchronization method of claim 16, wherein the out-of-synchronization is detected after finishing demodulating and decoding Physical Downlink Control Channel (PDCCH) data or Physical Downlink Shared Channel (PDSCH) data received from the service network in the ON duration.

18. The synchronization method of claim 16, wherein the OFF duration is the closest OFF duration to the ON duration, or the closest OFF duration to a next ON duration.

* * * * *